Oct. 14, 1958 J. F. BACHMANN 2,856,522
PHASE DETECTOR
Filed Sept. 16, 1953 7 Sheets-Sheet 1

JOHN F. BACHMANN
INVENTOR.

BY
Killman and Kerst
ATTORNEYS

Oct. 14, 1958

J. F. BACHMANN 2,856,522

PHASE DETECTOR

Filed Sept. 16, 1953

JOHN F. BACHMANN
*INVENTOR.*

BY

*Killman and Kerst*
ATTORNEYS

Oct. 14, 1958

J. F. BACHMANN 2,856,522

PHASE DETECTOR

Filed Sept. 16, 1953

JOHN F. BACHMANN
INVENTOR.

BY

*Killman and Kerst*
ATTORNEYS

Oct. 14, 1958  J. F. BACHMANN  2,856,522
PHASE DETECTOR

Filed Sept. 16, 1953  7 Sheets-Sheet 4

JOHN F. BACHMANN
INVENTOR.

BY

*Killman and Kerst*
ATTORNEYS

Oct. 14, 1958                J. F. BACHMANN                2,856,522
                               PHASE DETECTOR
Filed Sept. 16, 1953                                      7 Sheets-Sheet 5

JOHN F. BACHMANN
INVENTOR.

BY

*Killman and Kerst*
ATTORNEYS

Oct. 14, 1958  J. F. BACHMANN  2,856,522
PHASE DETECTOR
Filed Sept. 16, 1953
7 Sheets-Sheet 6
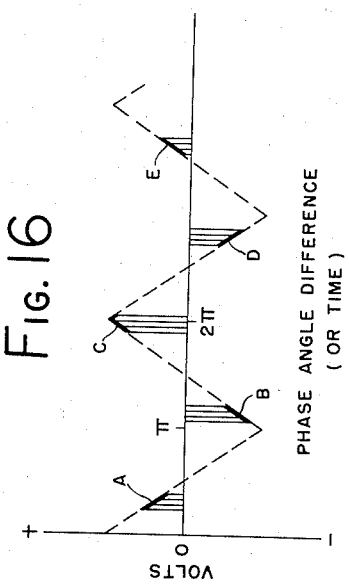
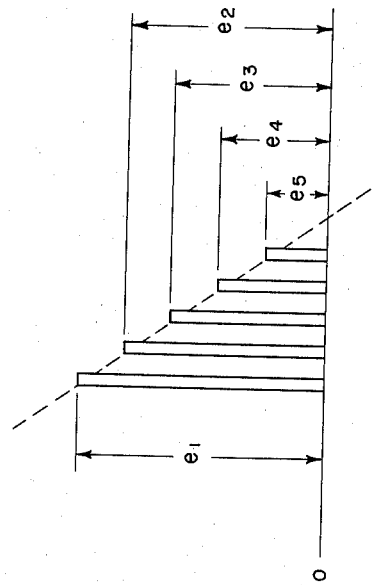
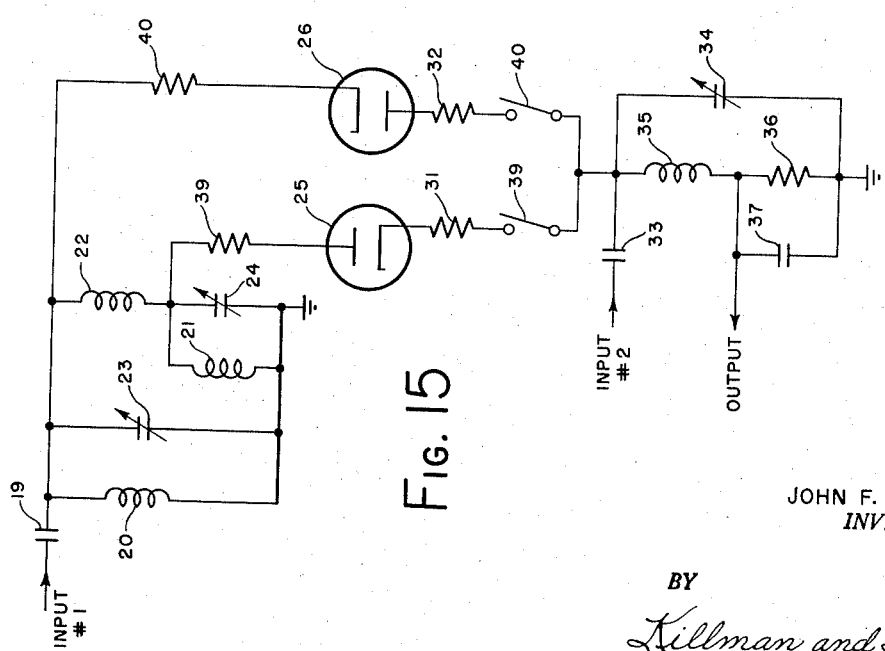
JOHN F. BACHMANN
INVENTOR.
BY
*Killman and Kerst*
ATTORNEYS

United States Patent Office 2,856,522
Patented Oct. 14, 1958

2,856,522

PHASE DETECTOR

John F. Bachmann, Baltimore, Md., assignor to Bendix Aviation Corporation, Towson, Md., a corporation of Delaware Application September 16, 1953, Serial No. 380,497

4 Claims. (Cl. 250—27)

This invention relates to radio signal echo locating systems and particularly to systems used for detecting and locating moving target objects.

A problem encountered in locating moving target objects by the use of radio signal echo systems is the masking effect caused by the stationary target objects. To eliminate this problem, Moving Target Indicator systems (M. T. I.) were devised. When systems of this type are employed, only the moving target objects are displayed on the system viewing screen. A conventional M. T. I. system consists of a pulse transmitter, a receiver, a stable oscillator the output of which mixes with signals from the transmitter and receiver such that phase related reference I. F. and echo I. F. signals are produced, a phase detector in which the phases of the two I. F. frequencies are compared, an oscillator and a modulator with phase detector output supplying the modulating signal, a delay means to delay part of the modulator output for a time equal to the interval between two successive pulses, and a subtract mixer to compare the delayed signal with the next signal such that constant signals produced by fixed target objects are eliminated while the signals produced by moving targets are retained. A detailed description of an M. T. I. system may be found in an article in the April 1953 issue of "Tele-Tech;" published by Caldwell-Clements Inc., Bristol, Conn. The article, beginning on page 86 is entitled "M. T. I. in Pulse Radar Systems and the Doppler Myth" by John F. Bachmann.

In a phase detector that is used in such systems, difficulty is experienced in providing matched components such that a balanced circuit is obtained. The present invention provides a means of obtaining the desired results without resorting to matched components.

An object of the present invention is to provide a phase detector that does not depend upon matched components to obtain a balanced condition.

Referring to the drawings:

Fig. 1 is a schematic diagram in block form of a typical M. T. I. system embodying the invention;

Fig. 15 is a circuit which is the same as Fig. 2 except for the rearrangement of components to facilitate in explaining the operation of the circuit.

Figure 2:
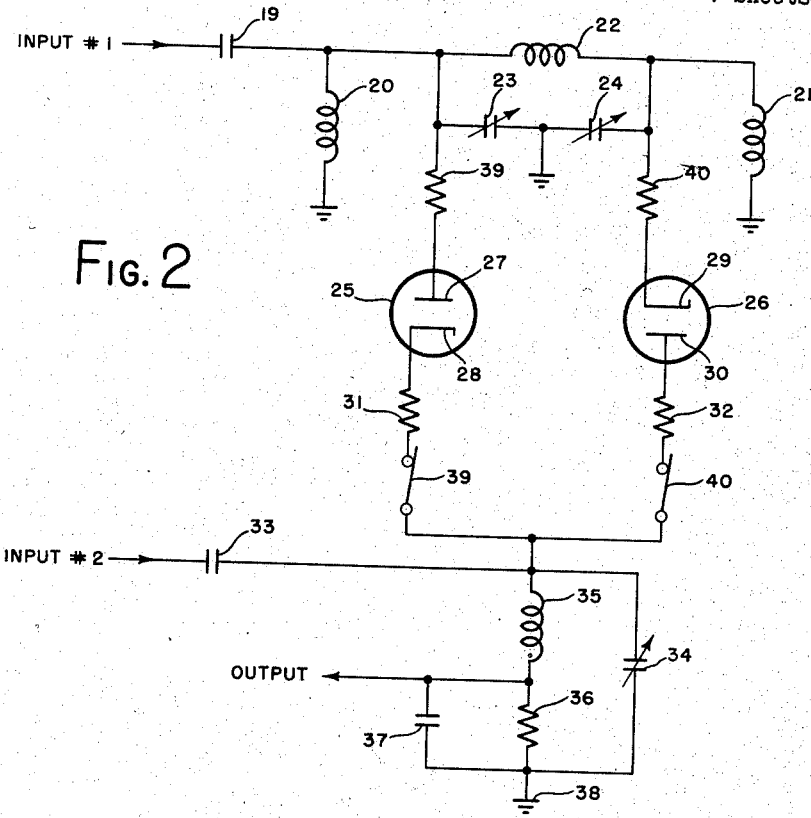
Fig. 2 is a schematic drawing of the invention.

Fig. 16 is a graph illustrating the output voltages of the phase detector of Fig. 2 when operating in an M. T. I. system;

Fig. 17 is a graph illustrating a group of pulses; and

Figure 18:
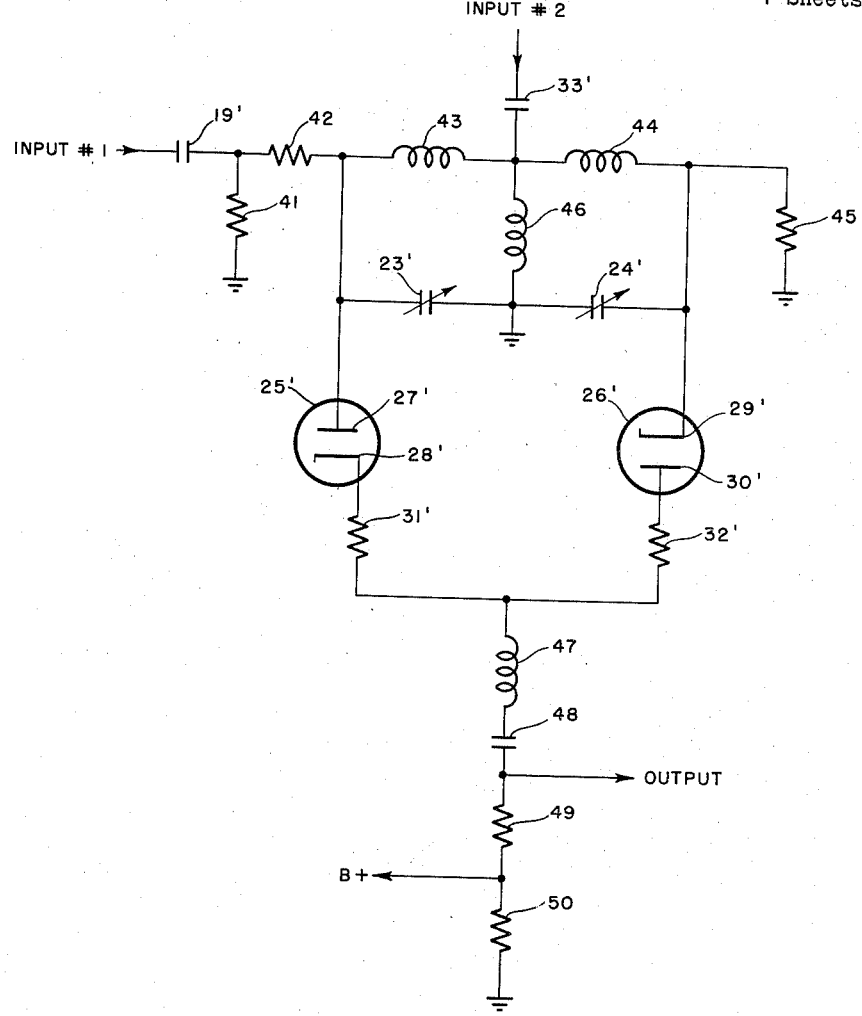

Fig. 18 is a schematic diagram of a phase detector presently employed in M. T. I. systems.

Figure 1:
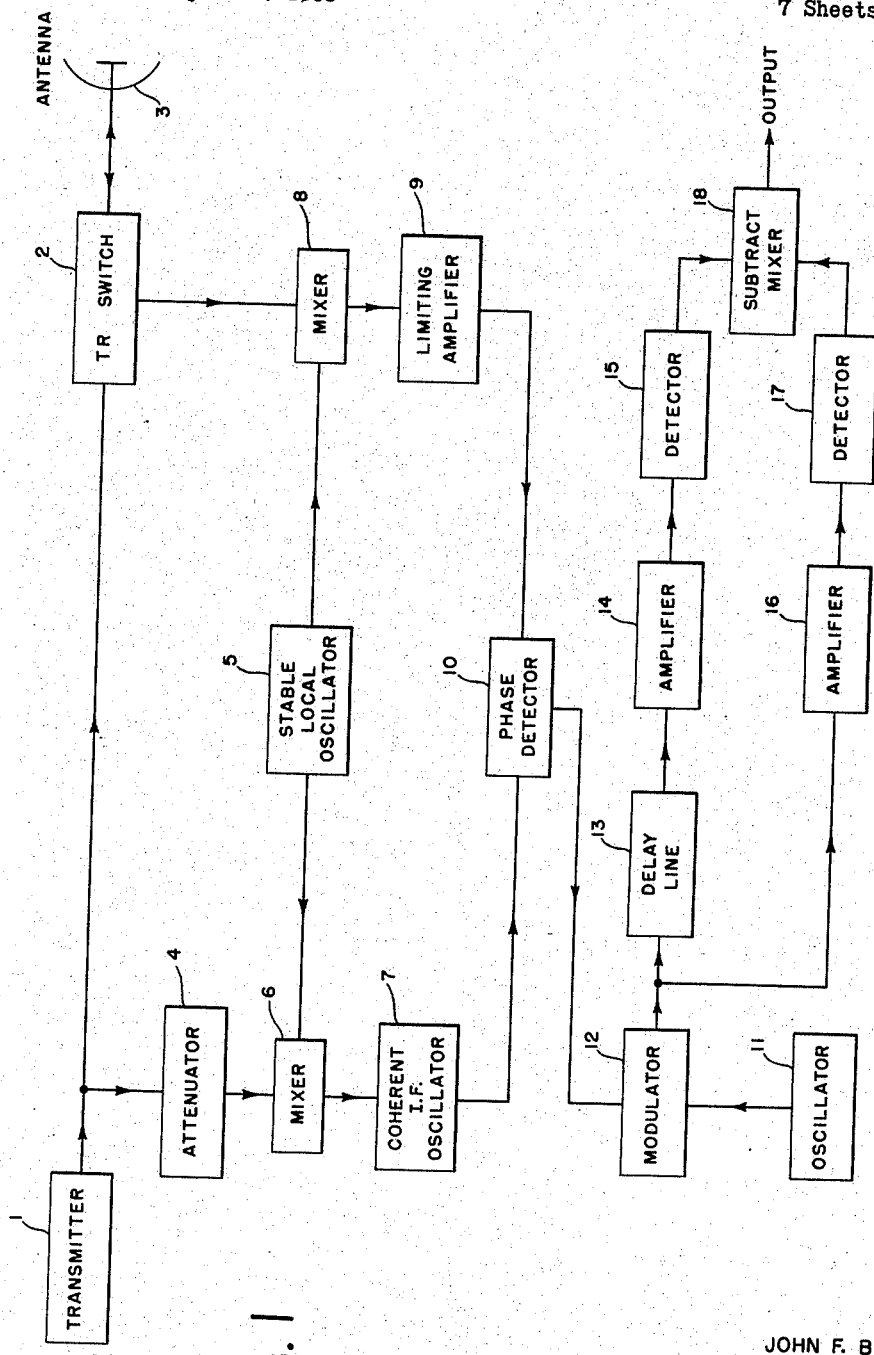

Referring now more particularly to the circuit of Fig. 1, a pulse transmitter 1 when connected through a T. R. switch 2 to an antenna 3 causes a signal to be radiated. A portion of the signal from the transmitter 1 passes through an attenuator 4 and is inserted into a mixer 6. A stable local oscillator 5 also injects a signal into the mixer 6, thereby producing an I. F. signal pulse at the output of the mixer 6. This I. F. signal pulse, when injected into a coherent I. F. oscillator 7, causes the oscillator 7 to lock-in with the I. F. signal pulse. The I. F. signal from the oscillator 7 is then inserted into a phase detector 10.

When the T. R. switch 2 is in the receive position and an echo signal is received by the antenna 3, that signal is mixed in a mixer 8 with a signal from the local oscillator 5. The output from the mixer 8 is amplified in a limiting amplifier 9 and then inserted into the phase detector 10.

The output of the phase detector 10, which is a function of the phase difference and of the rate of change of the phase difference in the input signals, modulates in a modulator 12 a signal from an oscillator 11. Part of the modulator 12 output is amplified in an amplifier 16, detected in a detector 17 and inserted into a subtract mixer 18. The rest of the modulator 12 output is delayed in a delay line 13 for a time equal to the interval between successive pulses of the signal, amplified in an amplifier 14, detected in a detector 15 and inserted into the subtract mixer 18. The ouput of the subtract mixer 18, which is a function of the radial velocity of the moving target objects, is then used, in conjunction with the circuitry of a standard radio echo location system, such that the presence of moving target objects are indicated on the viewing screen while the presence of the fixed target objects are not indicated.

Since the above described system is a conventional M. T. I. system, no further description of the system components will be given except for the phase detector 10 with which the present invention is concerned.

Before describing in detail the circuitry and operation of the phase detector 10, an explanation of the rate of change of the phase relationship between the coherent I. F. oscillator 7 and the I. F. limiting amplifier 9 will be presented.

Assume that—

(1) The transmitter signal $= E_m \sin(\rho t + \phi)$ where $\phi$ is the phase angle when $t=0$, and
(2) The stable oscillator signal $= E_n \sin(\omega t + \theta)$ where $\theta$ is the phase angle when $t=0$.

When these signals are mixed in the mixer 6, the resultant signal that is used is $C_1 E_n E_m \cos(\omega t + \theta - \rho t - \phi)$. As the coherent oscillator is locked-in with this signal, its output signal is $E_c \cos(\omega t + \theta - \rho t - \phi)$.

Also assume that—

(1) The echo wave signal $= E_c \sin(t_1 + \phi)$ (Note.—$t_1$ is the time starting when the leading edge of the echo pulse is received at the antenna. That is, when the leading edge of the echo pulse arrives at the antenna, $t_1=0$. As the phase of the R. F. signal in the pulse at the receiver at $t_1=0$ is the same as the R. F. signal in the pulse transmitted at $t=0$, the initial phase shift is $\phi$), and (2) The stable oscillator signal $= E_n \sin(\omega t + \theta)$ When these signals are mixed in the mixer 8, the resultant signal is $C_2 E_n E_e \cos(\omega t + \theta - \rho t_1 - \phi)$. As the limiting amplifier 9 amplies this signal, the output from the amplifier 9 is $E_a \cos(\omega t + \theta - \rho t_1 - \phi)$.

Comparing the two I. F. wave equations, it is seen that the equations involve two values of time. One value, $t$, starts when the pulse is initiated, while the second value, $t_1$, starts when the pulse arrives at the receiver. The time $t$ will be the summation of the times it takes for the pulse to travel from the transmitter to the target and from the target to the receiver. Calling this duration of time $t_2$, the equations become:

$$\text{Reference I.F.} = E_c \cos\ (\omega t_2 + \theta - \rho t_2 - \phi)$$

and $$\text{Echo I. F.} = E_a \cos\ (\omega t_2 + \theta - \rho t_1 - \phi)$$

As $t_1 = 0$ when the leading edge of the pulse arrives at the receiver, the signals at this time are:

$$\text{Reference I. F.} = E_c \cos\ [(\omega - \rho)t_2 + \theta - \phi]$$

and $$\text{Echo I. F.} = E_a \cos\ [\omega t_2 + \theta - \phi]$$

In comparing the phase relationship between the two signals, the terms that will remain constant for all values of time may be eliminated (that is, $\theta$ and $\phi$) as they are common to both signals and do nothing more than to move the reference point the same amount for both signals. Eliminating these constants will reduce the equations to:

$$\text{Reference I. F.} = E_c \cos\ [(\omega - \rho)t_2]$$

and $$\text{Echo I. F.} = E_a \cos\ [\omega t_2]$$

The terms $\omega$ and $\rho$ are also constants for any particular system. The remaining term $t_2$ will vary with the distance of the reflecting target object from the transmitting and receiving equipment. As the value of $t_2$ is increased from zero, the phase difference between the two signals will vary in a linear fashion.

While the phase relationship at the leading edge of the pulse was used for reasons of simplification, it may be readily shown that the same phase relationship will exist between the reference signal and any portion of the waveform in the pulse when it arrives at the receiver.

In the preceding discussion and analysis of the phase difference between the two signals, the Doppler effect and the reflecting characteristics of the target objects were neglected. This is justified as it may be proven by a mathematical analysis that the phase shift caused by the Doppler effect on the relatively few cycles in the pulse is negligible and since the reflection characteristics of any particular target object remain the same and would therefore not supply any information as proved in the above analysis.

Fig. 2 is a schematic diagram of the invention, the phase detector 10 of Fig. 1. Inputs 1 and 2 are the two signal inputs being inserted into the circuit through decoupling capacitors 19 and 33. Inductors 20 and 21 provide the D. C. return paths to the ground plane while retaining R. F. isolation. Capacitors 23 and 24 and inductor 22 form a tuned circuit for the signal from input 1, and are so proportioned that voltages equal but opposite in polarity will exist across the capacitors 23 and 24 when the circuit is energized. Resistors 39, 40, 31 and 32 are current limiting resistors to prevent rectifiers 25 and 26 from loading the circuit consisting of capacitors 23 and 24 and inductor 22. Rectifiers 25 and 26 are diode devices consisting of plates 26 and 27 and cathodes 28 and 29. Inductor 35 and capacitor 34 are adjusted such that a circuit tuned to the frequency of the signal of input 2 is provided. Resistor 36 provides a means across which is produced a voltage by the current flowing through inductance 35 because of the rectification performed on the input signals by the rectifiers 25 and 26. Capacitor 37 is an R. F. bypass around the resistor 36. Switches 39 and 40 are used in balancing the circuit.

Figure 3:
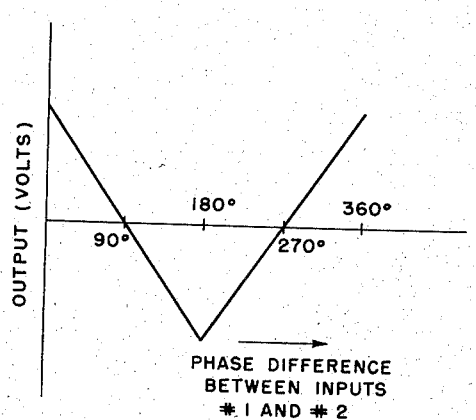
Fig. 3 is a graph showing the relation of the output voltage with respect to the phase difference between the input signals.

The functioning of the circuit of Fig. 2 is such that when two signals of like frequency are inserted, a D. C. voltage is produced at the output. The amplitude and polarity of the D. C. voltage is a function of the input signal amplitudes and their phase relationship. Making the two amplitudes equal and constant, an output voltage with respect to phase difference is produced as illustrated in Fig. 3. It will be noticed that except for the points where the slope changes sign at the 0° and 180° points, that the rate of change is essentially uniform with phase difference.

An explanation, by the use of equivalent circuits, of the operation of Fig. 2 as a phase detector is presented below. To help in the simplification of the explanation, two C. W. signals of slightly different frequency will be used as input signals. This will cause the phase relationship between the two waves to vary periodically at a rate of $f_1 - f_2$ where $f_1$ and $f_2$ are the frequencies of the generators.

Figure 4:
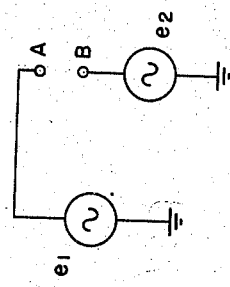

Fig. 4 is a circuit containing two signal sources $e_1$ and $e_2$. The voltage outputs of these two sources are:

$$e_1 = E \sin A$$

$$e_2 = E \sin\ (xA)$$

Figure 5:
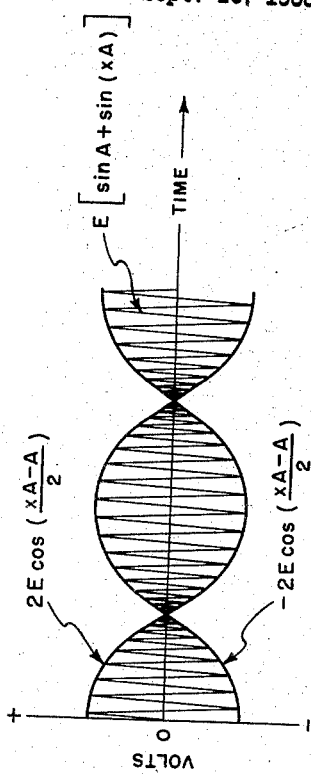
Fig. 4 through Fig. 14 are equivalent schematic diagrams and curves employed in explaining the operation of the phase detector of Fig. 2.

Therefore, the voltage between points A and B is:

$$E \sin A + E \sin\ (xA)$$

but $$E \sin A + E \sin\ (xA) = 2E \sin\left(\frac{xA + A}{2}\right) \cos\left(\frac{xA - A}{2}\right)$$

which is shown in Fig. 5, where $$2E \cos\left(\frac{xA - A}{2}\right)$$

and $$-2E \cos\left(\frac{xA - A}{2}\right)$$

are the equations of the envelope.

Figure 7:
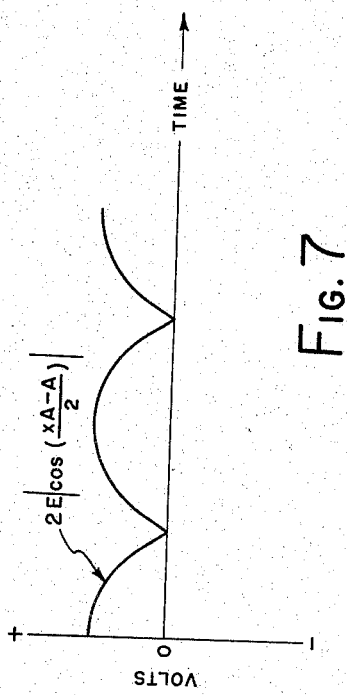
Figure 6:
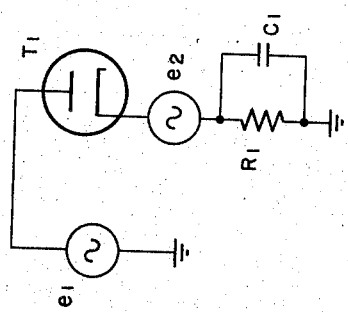

When a diode device $T_1$, a resistor $R_1$, and a capacitor $C_1$ are added to Fig. 4 such that the circuit of Fig. 6 is produced, and $x_{c_1}$ approaches zero at the frequencies of $e_1$ and $e_2$, rectification and filtering of the combined signal occurs such that the output wave developed across $R_1$, as shown in Fig. 7, is produced.

Figure 8:
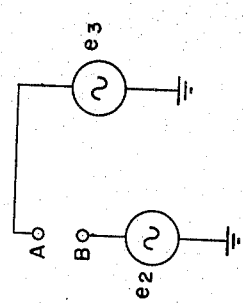

Next assume a circuit as shown in Fig. 8. This circuit is identical to that of Fig. 4 except source $e_1$ is now source $e_3$. The waveforms of the sources are:

$$e_2 = E \sin\ (xA), \text{ [same as before]}$$

$$e_3 = E \sin\ (A + 180)$$

$$= -E \sin A$$

Figure 9:
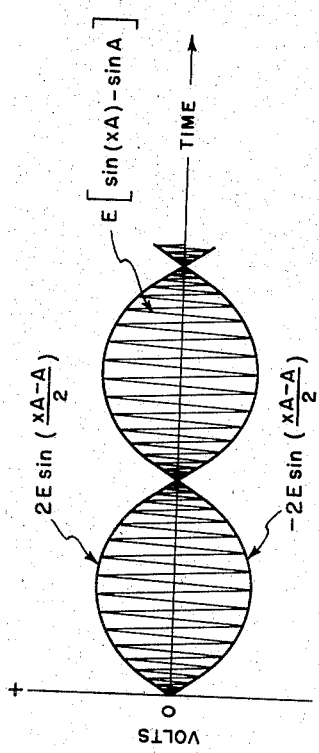

Therefore, the voltage waveform between points A and B is:

$$E \sin\ (xA) - E \sin A$$

but $$E \sin\ (xA) - E \sin A = 2E \cos\left(\frac{xA + A}{2}\right) \sin\left(\frac{xA - A}{2}\right)$$

which is shown in Fig. 9 where $$2E \sin\left(\frac{xA - A}{2}\right)$$

and $$-2E \sin\left(\frac{xA - A}{2}\right)$$

are the equations of the envelope.

Figure 11:
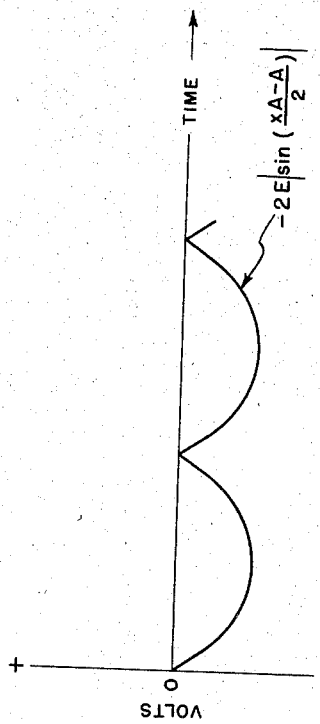
Figure 10:
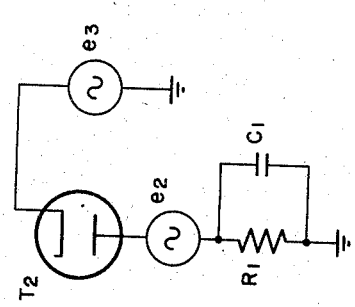

If a capacitor $C_1$, a resistor $R_1$, and a diode device $T_2$ are added to Fig. 8 such that a circuit as shown in Fig. 10 is produced, rectification and filtering of the combined voltages once again occurs and produces the voltage waveform across $R_1$ as shown in Fig. 11.

Figure 12:
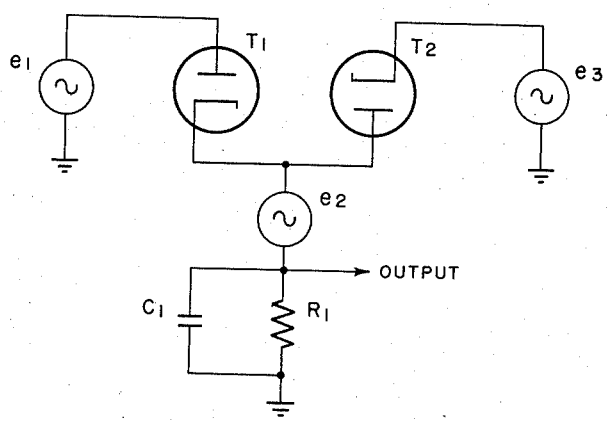
Figure 13:
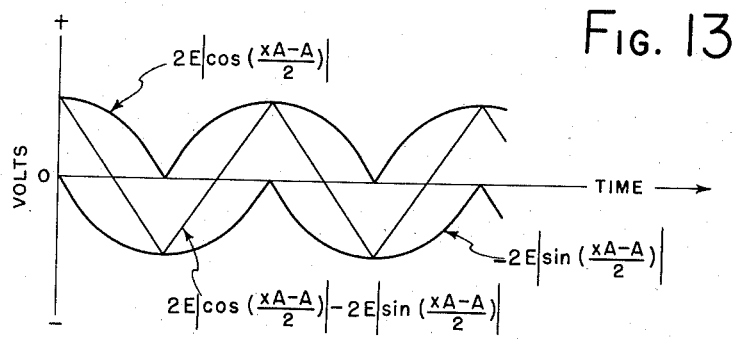
Figure 14:
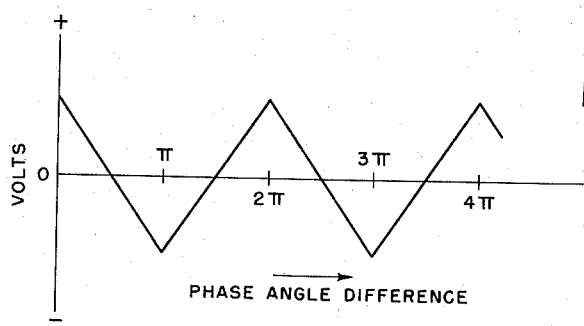

If Fig. 6 and Fig. 10 are combined to form the network of Fig. 12, a summation of the outputs shown in Fig. 7 and Fig. 11 occurs as shown in Fig. 13. As the phase angle difference between the two input waveforms is a straight line function with respect to time, phase angle difference may be substituted for time in Fig. 13. Fig. 14 shows the output of the network as a function of phase angle difference. It will be noticed that the summation, which is $$2E\left|\cos\left(\frac{xA-A}{2}\right)\right| - 2E\left|\sin\left(\frac{xA-A}{2}\right)\right|$$

is a straight line function with respect to phase angle difference, except for periodic reversals in polarity.

Referring back to Fig. 2, the inductor 22, and the capacitors 23 and 24 form a tuned circuit. As the center point between the two extremities of the capacitors 23 and 24 is returned to ground potential, the voltages appearing across these capacitors are equal and 180° out of phase with respect to each other. Therefore, sources $e_1$ and $e_3$ of Fig. 12 are the equivalent of the tuned circuit of Fig. 2 consisting of inductor 22, and capacitors 23 and 24, when that circuit is energized. Source $e_2$ of Fig. 12 is the equivalent of the tuned circuit in Fig. 2 consisting of inductor 35 and capacitor 34, when that circuit is energized. The output voltage is developed across the same component combination in both Fig. 2 and Fig. 12. Therefore, the output of the phase detector of Fig. 2 is the same as that of Fig. 12, which is shown in Fig. 14.

From the above analysis, the necessity of having voltages that are equal and 180° out of phase with respect to each other is realized. The circuit of Fig. 2 provides a means whereby the voltage amplitudes are quickly and easily adjusted. The circuit in Fig. 15 is a rearrangement of the circuit in Fig. 2 so that the balancing operation may be more easily understood. The balancing of the circuit is accomplished by the use of the switches 39 and 40, the capacitors 23 and 24, a pulsed signal generator, and an oscilloscope. The pulsed signal generator whose R. F. output is at the same frequency as that of the system I. F. signals, is connected to input 1 while input 2 is open circuited. The oscilloscope is connected to the output of the circuit. With a signal injected through input 1 and the switches 39 and 40 closed, the amplitude of the signal on the oscilloscope screen is observed and capacitor 24 is adjusted for a minimum deflection. With one of the switches closed and the other one opened, capacitor 23 is then adjusted to cause the circuit comprising inductor 22 and capacitors 23 and 24 to resonate, which is indicated by a maximizing of the deflection on the oscilloscope screen. At this time, the resonate circuit comprising inductor 35 and capacitor 34 is resonated by adjusting capacitor 34 such that a minimum deflection is viewed on the screen of the oscilloscope.

The circuit illustrated in Fig. 18 is a phase detector frequently used in M. T. I. systems. The components that have the prime notations perform the same functions as those in Fig. 2. Resistors 41 and 42 prevent the output capacitance of the preceeding stage from effecting the tuned circuit comprising inductors 43 and 44, and capacitors $23^1$ and $24^1$. Resistor 45 is provided to balance the effect of the resistors 41 and 42. Inductors 46 and 47 provide D. C. returns to ground while maintaining R. F. isolation; and capacitor 48 prohibits the passage of current from the B+ biasing source. Resistor 49 provides a load across which appears the output voltage and resistor 50 provides a return to ground for the B+ biasing voltage. With a signal inserted into input 1, the capacitors $23^1$ and $24^1$ are adjusted for voltages on the plate $27^1$ and cathode $29^1$ that are equal and 180° out of phase with respect to each other. Under these conditions, to have the circuit perform in a balanced state for input 1, rectifier $25^1$ and resistor $31^1$ should be similar to rectifier $26^1$ and resistor $32^1$ respectively. These similarities are not difficult to obtain. For a balanced state to exist for input 2, inductors 43 and 44 should be similar in addition to the above similarities. It is difficult to obtain inductors having similar characteristics and consequently, this balance state with respect to input 2 is not easily obtained. Because the present invention inserts input 2 between the point of junction of resistors 31 and 32 and ground, this problem is circumvented.

Although continuous signals were inserted into the equivalent circuits to aid in the description of the operation of the phase detector circuit, this condition does not exist in practice because of the periodic groups of pulses supplied by virtue of the rotation of the system antenna. The system is so arranged and adjusted that a sufficient duration and frequency of the groups of pulses occur to provide the required output. The factors effecting the output of the phase detector are the R. F. frequency, the pulse repetition rate, and the radial velocity of the moving target. Referring to Fig. 16, intervals A, B, C, D and E refer to the periods during which groups of pulses are being received by the system. The frequency of these groups is determined by the rotational velocity of the antenna. The number of pulses received in a group of pulses depends on the pulse rate of the transmitter, the effective beam width of the antenna and the velocity of rotation of the antenna.

Fig. 17 is an enlargement of a group of pulses shown in Fig. 16. Each of the pulses modulates the signal from the oscillator 11 in Fig. 1 and then is subtracted from the preceeding pulse. If the target is not moving, all of the pulses will have the same amplitude and therefore no output signal will exist.

What is claimed is:

1. A phase detector circuit, the output of which is a unidirectional potential having its amplitude and polarity depending upon the amplitude and phase relationship of two input signals, comprising: a parallel circuit consisting of an inductor and two capacitors serially connected therewith, the junction of said capacitors being returned to a ground reference, and said parallel circuit being adjusted for parallel resonance at the frequency of said input signals; a capacitor coupling one of said input signals into said parallel circuit; two radio frequency choke inductors connected from respective ends of said parallel circuit to said ground reference; four resistors; a pair of rectifiers, each terminal of which has connected thereto a respective terminal of one of said resistors; two of said resistors connected to unlike poles in said rectifiers having their remaining terminals joined together; one of the remaining terminals of said resistors being connected to a point of junction between said inductor and one of said capacitors of said parallel circuit; the remaining terminal of said resistors being connected to the point of junction between said inductor and the second of said capacitors in said parallel circuit; a second parallel circuit, adjusted to resonate at the frequencies of the input signals, connected between said point of junction of said two resistors and said ground reference; a capacitor comprising one half of said second parallel circuit; the second half of said parallel circuit consisting of an inductor in series connection with a parallel combination of a capacitor and a resistor; the second of said inputs being coupled by a capacitor into said phase detector circuit at said point of junction of said two resistors and said second parallel circuit; and the output of said phase detector circuit being obtained from the point of junction of said inductor and said parallel combination of said resistor and said capacitor of said second parallel circuit.

2. A phase detector circuit, the output of which is a unidirectional potential having its amplitude and polarity depending upon the amplitude and phase relationship of two input signals, comprising: a parallel circuit consisting of an inductor and two capacitors serially connected therewith, the junction of said capacitors being returned to a ground reference, and said parallel circuit being adjusted for parallel resonance at the frequency of said input signals; the first of said inputs being coupled into said parallel circuit; two radio frequency choke inductors connected from respective ends of said parallel circuit to said ground reference; four resistors; a pair of rectifiers, each terminal of which has connected thereto a respective terminal of one of said resistors; two of said resistors connected to unlike poles in said rectifiers having their remaining terminals joined together; one of the remaining terminals of said resistors being connected to a point of junction between said inductor and one of said capacitors of said parallel circuit; the remaining terminal of said resistors being connected to the point of junction between said inductor and the second of said capacitors in said parallel circuit; an impedance network, connected between said point of junction of said two resistors and said ground reference; the second of said inputs being coupled into said phase detector circuit at said point of junction of said two resistors and said network; and the output of said phase detector circuit being obtained from a point in said network.

3. A demodulator circuit, the output of which is an alternating voltage having its amplitude and frequency depending upon the amplitude and frequency of the two input signals, comprising: a parallel circuit consisting of an inductor and two capacitors serially connected therewith, the junction of said capacitors being returned to a ground reference; a capacitor coupling one of said input signals into said parallel circuit; said parallel circuit being adjusted for parallel resonance at the mean frequency of said input signal; two radio frequency choke inductors connected from respective ends of said parallel circuit to said ground reference; four resistors; a pair of rectifiers, each terminal of which has connected thereto a respective terminal of one of said resistors; two of said resistors, connected to unlike poles in said rectifiers, having their remaining terminals joined together; one of the remaining terminals of said resistors being connected to a point of junction between said inductor and one of said capacitors of said parallel circuit; the remaining terminal of said resistors being connected to the point of junction between said inductor and the second of said capacitors in said parallel circuit; a second parallel circuit connected between said point of junction of said two resistors and said ground reference; a capacitor comprising one half of said second parallel circuit; the second half of said parallel circuit consisting of an inductor in series connection with a parallel combination of a capacitor and a resistor; the second of said inputs being coupled by a capacitor into said demodulator circuit at said point of junction of said two resistors and said second parallel circuit; said second parallel circuit being adjusted to resonate at the mean frequency of said second input signal; and the output of said demodulator circuit being obtained from the point of junction of said inductor and said parallel combination of said resistor and said capacitor of said second parallel circuit.

4. A modulator circuit, the output of which is an alternating voltage having its amplitude and frequency depending upon the amplitude and frequency of the two input signals, comprising: a parallel circuit consisting of an inductor and two capacitors serially connected therewith, the junction of said capacitors being returned to a ground reference; a capacitor coupling one of said input signals into said parallel circuit; said parallel circuit being adjusted for parallel resonance at the mean frequency of said input signal; two radio frequency choke inductors connected from respective ends of said parallel circuit to said ground reference; four resistors; a pair of rectifiers, each terminal of which has connected thereto a respective terminal of one of said resistors; two of said resistors, connected to unlike poles in said rectifiers, having their remaining terminals joined together; one of the remaining terminals of said resistors being connected to a point of junction between said inductor and one of said capacitors of said parallel circuit; the remaining terminal of said resistors being connected to the point of junction between said inductor and the second of said capacitors in said parallel circuit; an impedance network, connected between said point of junction of said two resistors and said ground reference; the second of said inputs being coupled into said demodulator circuit at said point of junction of said two resistors and said network; and the output of said demodulator circuit being obtained from a point in said network.

References Cited in the file of this patent

UNITED STATES PATENTS

| | | |
|---|---|---|
| 1,899,580 | Lynn | Feb. 28, 1933 |
| 1,998,322 | Kaar | Apr. 16, 1935 |
| 2,280,545 | Schock | Apr. 21, 1942 |
| 2,494,751 | Forster | Jan. 17, 1950 |
| 2,510,710 | Moore | June 6, 1950 |
| 2,564,471 | Eaton | Aug. 14, 1951 |
| 2,568,250 | O'Brien | Sept. 18, 1951 |
| 2,586,119 | Tellier et al. | Feb. 19, 1952 |
| 2,700,103 | Selove | Jan. 18, 1955 |